(12) United States Patent
Shalev et al.

(10) Patent No.: US 10,713,214 B1
(45) Date of Patent: *Jul. 14, 2020

(54) HARDWARE ACCELERATOR FOR OUTER-PRODUCT MATRIX MULTIPLICATION

(71) Applicant: Habana Labs Ltd., Tel Aviv (IL)

(72) Inventors: Ron Shalev, Pardes Hanna-Karkur (IL); Ran Halutz, Ramat HaSharon (IL)

(73) Assignee: HABANA LABS LTD., Caesarea (IL)

( * ) Notice: Subject to any disclaimer, the term of this patent is extended or adjusted under 35 U.S.C. 154(b) by 91 days.

This patent is subject to a terminal disclaimer.

(21) Appl. No.: 16/136,294

(22) Filed: Sep. 20, 2018

Related U.S. Application Data (60) Provisional application No. 62/563,706, filed on Sep. 27, 2017.

(51) Int. Cl.
| | | |
|---|---|---|
| *G06F 15/80* | (2006.01) | |
| *G06F 17/16* | (2006.01) | |
| *G06F 9/30* | (2018.01) | |
| *G06F 7/544* | (2006.01) | |
| *G06F 7/487* | (2006.01) | |

(52) U.S. Cl.
CPC ........ *G06F 15/8046* (2013.01); *G06F 7/5443* (2013.01); *G06F 9/3001* (2013.01); *G06F 9/30036* (2013.01); *G06F 17/16* (2013.01); *G06F 7/4876* (2013.01)

(58) Field of Classification Search
None
See application file for complete search history.

(56) References Cited

U.S. PATENT DOCUMENTS

| | | | |
|---|---|---|---|
| 5,471,627 A | * | 11/1995 | Means ............... G06K 9/56 712/19 |
| 7,543,119 B2 | | 6/2009 | Hessel et al. |
| 9,262,165 B2 | | 2/2016 | Hatano et al. |

(Continued)

OTHER PUBLICATIONS

Lim, H. etal., Multidimensional Systolic Arrays for the Implementation of Discrete Fourier Transforms, 1999 IEEE, IEEE transactions on Signal Processing vol. 47, No. 5. pp. 1359-1370. (Year: 1999).*

(Continued)

*Primary Examiner* — Eric Coleman
(74) *Attorney, Agent, or Firm* — Kligler & Associates Patent Attorneys Ltd (57) ABSTRACT

Computational apparatus includes a systolic array of processing elements, each including a multiplier and first and second accumulators. In each of a sequence of processing cycles, the processing elements perform the following steps concurrently: Each processing element, except in the first row and first column of the array, receives first and second operands from adjacent processing elements in a preceding row and column of the array, respectively, multiplies the first and second operands together to generate a product, and accumulates the product in the first accumulator. In addition, each processing element passes a stored output data value from the second accumulator to a succeeding processing element along a respective column of the array, receives a new output data value from a preceding processing element along the respective column, and stores the new output data value in the second accumulator.

22 Claims, 5 Drawing Sheets

(56) References Cited

U.S. PATENT DOCUMENTS

| | | | |
|---|---|---|---|
| 2003/0225805 A1* | 12/2003 | Nash | G06F 17/141 |
| | | | 708/403 |
| 2006/0095258 A1* | 5/2006 | Jeong | G06K 9/624 |
| | | | 704/233 |
| 2008/0052693 A1 | 2/2008 | Archambault et al. | |
| 2011/0307459 A1 | 12/2011 | Jacob (Yaakov) | |
| 2014/0181171 A1* | 6/2014 | Dourbal | G06F 17/16 |
| | | | 708/607 |
| 2015/0269122 A1 | 9/2015 | Lang | |
| 2017/0255572 A1 | 9/2017 | Rohe et al. | |
| 2017/0344514 A1 | 11/2017 | Zhou | |
| 2018/0074962 A1 | 3/2018 | Giefers et al. | |

OTHER PUBLICATIONS

Mellott, J. etal., The Gauss Machine: a Galois-Enhanced Quadratic Residue No. System Systolic Array, IEEE. pp. 156-162. (Year: 1993).*

Scheiman, C. etal., A Processor-Time Schedule for the Standard Tensor Product Algorithm, IEEE. pp. 176-187. (Year: 1994).*

Shalev et al., U.S. Appl. No. 15/700,213, filed Sep. 11, 2017.

Shalev et al., U.S. Appl. No. 15/700,207, filed Sep. 11, 2017.

Halutz et al ., U.S. Appl. No. 16/186,620, filed Nov. 12, 2018.

U.S. Appl. No. 15/700,207 office action dated Oct. 1, 2018.

Chetlur et al., "cuDNN: Efficient Primitives for Deep Learning", NVIDIA, Santa Clara, CA, arXiv:1410.0759v3 [cs.NE], pp. 1-9, Dec. 18, 2014.

Suda et al., "Throughput-Optimized OpenCL-based FPGA Accelerator for Large-Scale Convolutional Neural Networks", FPGA '16 Proceedings of the 2016 ACM/SIGDA International Symposium on Field-Programmable Gate Arrays, pp. 16-25, Feb. 21-23, 2016.

Abuzaid et al., "Gaffe con Troll: Shallow Ideas to Speed Up Deep Learning", DanaC'15 Proceedings of the Fourth Workshop on Data analytics in the Cloud, Article No. 2 , 6 pages, May 31-Jun. 4, 2015.

Yang et al., "A Systematic Approach to Blocking Convolutional Neural Networks",Stanford University, arXiv:1606.04209v1 [cs. DC], pp. 1-12, Jun. 14, 2016.

U.S. Appl. No. 16/170,069 office action dated Apr. 14, 2020.

* cited by examiner

HARDWARE ACCELERATOR FOR OUTER-PRODUCT MATRIX MULTIPLICATION

CROSS-REFERENCE TO RELATED APPLICATION

This application claims the benefit of U.S. Provisional Patent Application 62/563,706, filed Sep. 27, 2017, which is incorporated herein by reference.

FIELD OF THE INVENTION

The present invention relates generally to computational devices, and specifically to apparatus and methods for high-speed parallel computations.

BACKGROUND

Convolutional neural nets (CNNs) are being used increasingly in complex classification and recognition tasks, such as image classification, object recognition, and automatic speech recognition. Large-scale matrix multiplications are a key component in multi-dimensional tensor convolutions, which are the basic building block of the CNN. For this reason, special-purpose hardware architectures have been proposed for the purpose of parallelizing such matrix multiplications.

Multi-dimensional tensor convolutions are commonly decomposed into multiple outer product computations over pairs of two-dimensional matrices. The outer product (also known as the tensor product or Kronecker product) of two matrices A and B having elements $\{a_{ij}\}$ and $\{b_{ij}\}$, respectively, is written as $C=A\otimes B$, with elements $$c_{ij} = \sum_{p=1}^{m} a_{ip} b_{pj}.$$

Typically, to compute each two-dimensional plane in an output tensor, multiple outer products of this sort are computed and summed together in a sequence of matrix multiply-accumulate operations of the form $C_{out}=C_{in}+A\otimes B$.

SUMMARY

Embodiments of the present invention that are described hereinbelow provide improved apparatus and methods for performing parallel computations over large arrays of data.

There is therefore provided, in accordance with an embodiment of the invention, computational apparatus, including a systolic array of processing elements arranged in a grid of rows and columns. Each processing element includes a multiplier and first and second accumulators and is configured such that in each of a sequence of processing cycles, the processing elements perform the following steps concurrently:

The processing elements in a first row of the array receive a first vector of first operands, while the processing elements in a first column of the array receive a second vector of second operands.

Each processing element, except in the first row and first column, receives the first and second operands from adjacent processing elements in a preceding row and column of the array, respectively, multiplies the first and second operands together to generate a product, and accumulates the product in the first accumulator.

Each processing element passes a stored output data value from the second accumulator to a succeeding processing element along a respective column of the array, receives a new output data value from a preceding processing element along the respective column, and stores the new output data value in the second accumulator.

Synchronization logic is coupled to load a succession of the first and second vectors into the first row and first column of the array, and upon completion of processing of the succession by the array, to trigger the processing elements to transfer respective data values from the first accumulator to the second accumulator for output from the array.

In some embodiments, the processing elements are configured to pass the stored output data values that were computed over a first succession of the first and second vectors through the second accumulators along the columns of the array concurrently with processing the operands in a second succession of the first and second vectors and accumulating products of the operands in the first accumulators. In some of these embodiments, each of the first and second successions of the first and second vectors includes a respective pair of matrices to be multiplied together. In a disclosed embodiment, the synchronization logic is coupled to receive successive rows and columns of the matrices from a memory and to apply different, respective offsets to successive matrix elements in the received columns and rows of the matrices in order to assemble the succession of the first and second vectors for input to the array. In one embodiment, the processing elements are arranged to compute and output an outer product of each pair of the matrices.

In some embodiments, the apparatus includes a random-access memory (RAM), which is coupled to receive and store the data values that are output successively from the second accumulators in an output row of the array over the sequence of processing cycles. Typically, the RAM includes a matrix of memory cells and is configured to accumulate the data values that are computed by the processing elements and output from the array in memory cells that correspond respectively to the processing elements that computed the data values.

In some embodiments, the apparatus includes computational logic, which is coupled to add each of the data values that is output from the array to an accumulated data value that is stored in a corresponding memory cell so as to generate a sum, and to store the sum in the corresponding memory cell. Typically, the computational logic is configured read, sum and store the data values in the memory cells concurrently with the processing cycles of the array of processing elements, so that in each cycle, the data values that are output from the array are accumulated in the corresponding memory cells. Additionally or alternatively, the RAM includes a first plurality of banks of the memory cells, which are coupled to respective columns of the array, and the computational logic includes a second plurality of arithmetic logic units, each coupled to read and sum the data values that are output from a respective column of the array.

In a disclosed embodiment, the RAM includes load and store ports, which are coupled to transfer data into and out of the RAM, wherein the synchronization logic is configured to delay transferring the output data values from the array to the RAM until the data currently stored in the RAM has been transferred out through the store port.

There is also provided, in accordance with an embodiment of the invention, a method for computation, which includes providing a systolic array of processing elements arranged in a grid of rows and columns, each processing element including a multiplier and first and second accumulators. In each of a sequence of processing cycles, the following steps are performed concurrently:

A first vector of first operands is received in the processing elements in a first row of the array, and a second vector of second operand is received in the processing elements in a first column of the array.

Each processing element, except in the first row and first column, receives the first and second operands from adjacent processing elements in a preceding row and column of the array, respectively.

The first and second operands are multiplied together in each processing element to generate a product, and the product is accumulated in the first accumulator.

A stored output data value is passed from the second accumulator in each processing element to a succeeding processing element along a respective column of the array.

Each processing element receives a new output data value from a preceding processing element along the respective column, and stores the new output data value in the second accumulator.

To enable the above steps, a succession of the first and second vectors are loaded into the first row and column of the array. Upon completion of processing of the succession by the array, the processing elements are triggered to transfer respective data values from the first accumulator to the second accumulator for output from the array.

The present invention will be more fully understood from the following detailed description of the embodiments thereof, taken together with the drawings in which:

DETAILED DESCRIPTION OF EMBODIMENTS

Overview

Embodiments of the present invention that are described herein provide a novel hardware architecture, which can be applied in efficient computation of matrix multiplication. The architecture is based on a systolic array of processing elements, which perform multiply and accumulate operations in which each processing element multiply together respective pairs of input operands and accumulate products of the multiplication over multiple cycles in order to generate respective output data values. Novel data access logic arranges and loads data for processing by the elements, as well as cumulatively summing the multiplication results with preceding results. This architecture is particularly useful in computing and accumulating outer products of multiple pairs of input matrices—operations of the form $C_{out}=C_{in}+A \otimes B$, as defined above—but can alternatively be used in hardware-based acceleration of other sorts of large-scale computations.

The array of processing elements in the present embodiments is systolic in the following sense: Synchronization logic loads a succession of row vectors into the first row of the array and column vectors into the first column of the array, such that in each processing cycle, the processing elements in a first row of the array receive a first vector of first operands, while the processing elements in a first column of the array receive a second vector of second operands. (The terms "first" and "second" in regard to the operands are used arbitrarily, for the sake of convenience, since the operations carried out by the processing elements in the disclosed embodiments are commutative.) In each processing cycle, each processing element in the array (except in the first row and first column) receives a pair of first and second operands from the adjacent processing elements in the preceding row and column of the array, respectively. The processing elements multiply the first and second operands together to generate a product, and accumulate the product in a first accumulator.

The successions of first and second vectors are taken from the rows and columns of a pair of matrices that are to be multiplied together. Synchronization logic reads the operand matrices from a memory and arranges the matrix elements in the proper order in the first and second vectors so that the matrix elements reach the processing elements in proper synchronization to compute the elements of the outer product. For this purpose, in one embodiment of the invention, the synchronization logic applies different, respective offsets to successive matrix elements in the columns and rows of the operand matrices that it reads from the memory in order to assemble the succession of the first and second vectors for input to the array. Thus, the synchronization logic arranges the elements of one operand matrix into row vectors, which are fed in one at a time from the top of the array of processing elements and passed down through the rows of the array, while arranging the elements of the other operand matrix into column vectors, which are fed in a column at a time from the left side of the array and passed from left to right across the columns of the array.

Once all of the elements of the matrices have traversed the entire array, the accumulated data values corresponding to the results of the multiplication will now be stored in the first accumulators and can be output a row at a time, flowing up or down the columns of the array. (The terms "columns" and "rows" are used arbitrarily, for the sake of convenience, to refer to the two orthogonal axes of the array and could equivalently be interchanged, in which case it would be said that the data values are output a column at a time across the rows of the array.) These results typically represent the elements of the outer product of the pair of matrices, although the array may alternatively be configured to perform other sorts of computations.

For purposes of the output flow of data values, each processing element in the array comprises a second accumulator. Upon completion of processing of the entire succession of row and column vectors (meaning that the last of the vectors have reached and been operated on by the processing elements in the last row and column of the array), the synchronization logic triggers the processing elements to transfer their accumulated data values from the first accumulator to the respective second accumulator. At each subsequent processing cycle, each processing element passes the output data value that is stored in its second accumulator to the next processing element along its respective column of the array, and then receives and stores in the second accumulate a new output data value from the preceding processing element along the respective column.

For efficient use of processing resources, immediately after the synchronization logic has loaded the last row and column of a first pair of matrices into the array of processing elements, it can begin to feed the successive rows and columns of a new pair of matrices to the array. (If one or both of the matrices are not square, so that the common dimension of the pair of matrices is less than the number of rows in one of the matrices, it may be necessary to delay for a number of processing before starting to feed the next pair of matrices to the array.) The processing elements process the operands in this second succession of vectors and accumulate their products in the first accumulators concurrently—in the same sequence of processing cycles—with passing the stored output data values that were computed over the first succession of vectors through the second accumulators along the columns of the array. Thus, the results of the multiplication of the first pair of matrices are clocked out of the array through the second accumulators, row by row, at the same time as the products of the second pair of matrices are accumulated in the first accumulators. This mode of operation can be repeated over a large succession of matrix pairs.

In some embodiments of the present invention, the results of the multiplication are stored in a random-access memory (RAM), which receives the data values that are output successively via the second accumulators from the output row of the array in each processing cycles. (The output row may be, for example, the same first row that receives the row vectors of operands or the last row, depending on the direction of data flow along the columns through the second accumulators.) The RAM is typically configured to accumulate the data values that are computed by the processing elements over multiple pairs of operand matrices, thus generating the cumulative result $C_{out}=C_{in}+A\otimes B$, as explained above. For this purpose, the RAM comprises an array of memory cells that correspond respectively to the array of processing elements, with computational logic coupled to add each of the data values that is output from the array to the accumulated data value that is stored in the corresponding memory cell.

This use of an external RAM for purposes of data accumulation obviates the need to store the cumulative results within the array of processing elements, and thus reduces the physical size and power consumption of the processing elements. The memory cells of the RAM are considerably smaller and more power-efficient than the flip-flops that are used in implementing the accumulators in the systolic array. The RAM and computational logic can be configured, as described in detail hereinbelow, to read, sum and store the data values in the memory cells concurrently with the processing cycles of the array of processing elements. Thus in each cycle, the data values that are output from the array are accumulated in the corresponding memory cells, so that the full throughput of the array of processing elements is maintained in the final stage of RAM-based accumulation.

Implementation

Figure 1:
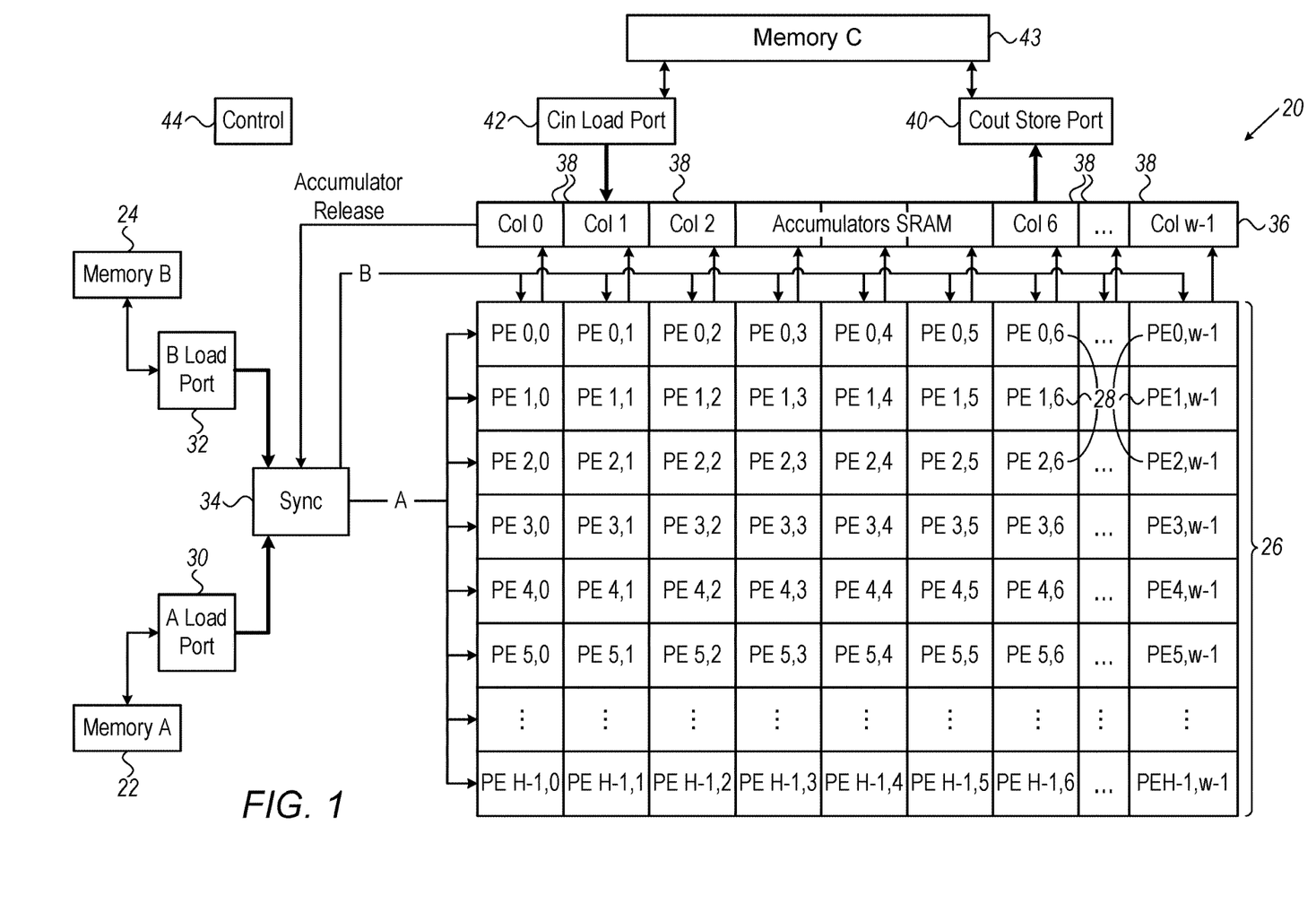
FIG. 1 is a block diagram that schematically illustrates a hardware accelerator for matrix multiplication, in accordance with an embodiment of the invention.

FIG. 1 is a block diagram that schematically illustrates a hardware accelerator 20 for matrix multiplication, in accordance with an embodiment of the invention. Accelerator 20 comprises a systolic array 26 of processing elements 28, which are arranged in a grid of H rows and W columns. Accelerator 20 is typically implemented in hardware logic, which may be hard-wired or programmable, in a single integrated circuit chip. Alternatively, the components of accelerator 20 may be partitioned among two or more chips and may include standard components, such as a programmable processor and/or memory.

Accelerator 20 operates on matrices A and B of operands, which are stored respectively in memories 22 and 24 and then multiplied together in array 26. Typically, memories 22 and 24 are separate from accelerator 20 and may simply comprise regions allocated within the system memory of a computing system in which the accelerator is installed.

Synchronization logic 34 loads a succession of vectors into the first column and first row of array 26 from memories 22 and 24 via load ports 30 and 32, respectively. Typically, a new vector can be loaded from each load port in each processing cycle of the array. For this purpose, each load port 30, 32 receives a descriptor of its operand matrix, which contains the base address of the matrix in memory 22, 24, and possibly the size and stride of the vectors to be read from the input matrices, as well as the size (in bytes) of the matrix elements. The "stride" is defined as the address difference between each two consecutive elements in the same dimension of a given matrix that are to be loaded by the load port, while the "size" is the number of valid elements in a dimension of a given matrix. When load ports 30, 32 receive a valid descriptor, they start fetching the vectors of matrix elements from memories 22, 24 that are specified by the descriptor. The load ports push these vectors to synchronization logic 34, which delivers the elements of matrix A as operands to processing elements 28 in the first column of array 26 (labeled PE 0,0; PE 1,0; . . . ; PE H-1,0), and delivers the elements of matrix B as operands to processing elements 28 in the first row of the array (labeled PE 0,0; PE 0,1; . . . ; PE 0,W-1).

As a result, in each processing cycle, each processing element 28 multiplies two scalar operands: an element "a" of matrix A, and an element "b" of matrix B. Each processing element then passes its "a" operand to the next processing element along its row and passes its "b" operand to the next processing element in its column. At each processing cycle, the product of the multiplication is summed with the previous product in an accumulator in each processing element. As a result, after n cycles of this sort of multiplication and accumulation, each processing element holds a respective matrix element of the outer product $A\otimes B$ (wherein n is the common dimension of matrixes A and B). Further details of the structure and operation of processing elements 28 are described hereinbelow with reference to FIG. 3.

Figure 3:
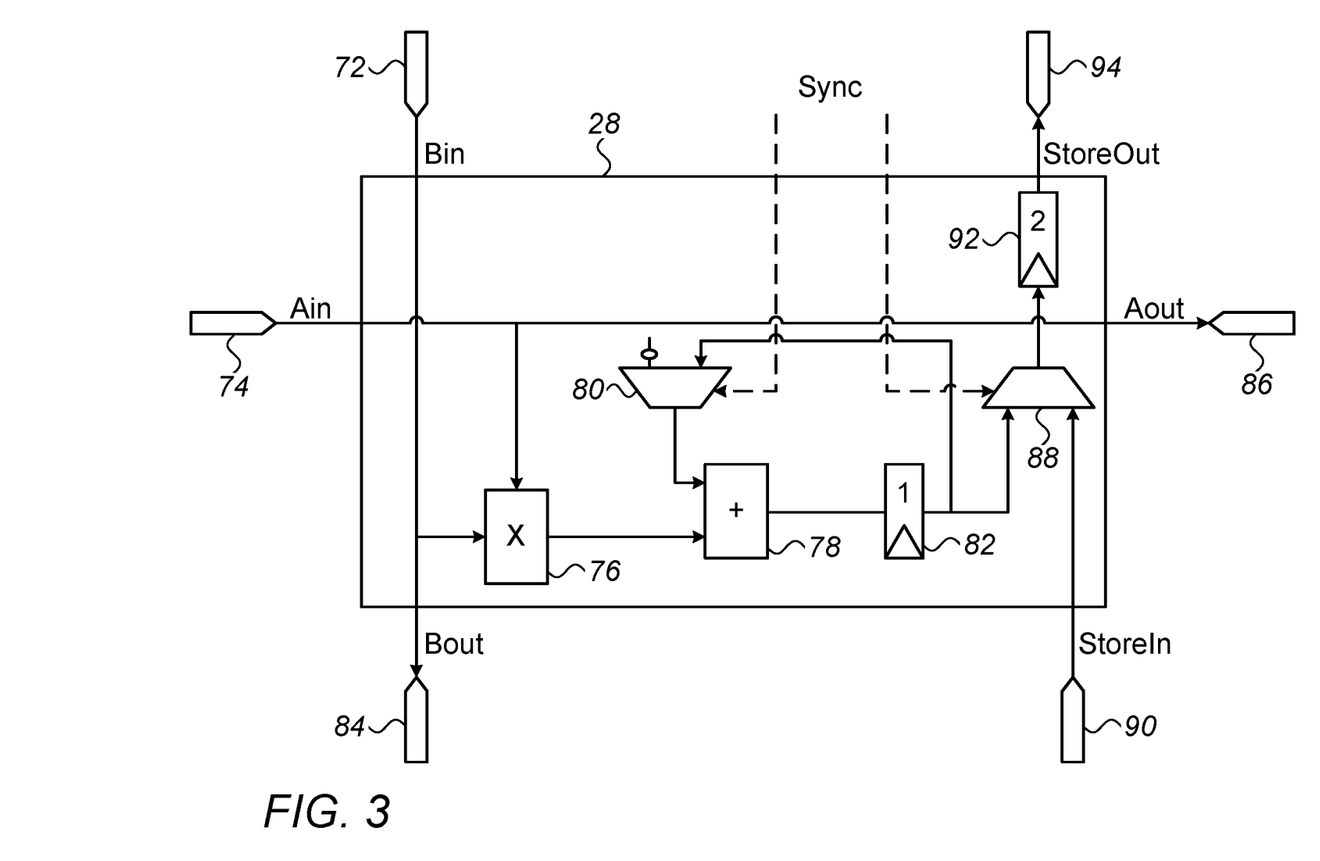
FIG. 3 is a block diagram that schematically shows details of a processing element, in accordance with an embodiment of the invention.

Upon completion of processing by array 26 of the entire successions of vectors making up matrices A and B, synchronization logic 34 triggers processing elements 28 to transfer the respective output data values from the accumulators to a shift register for readout from array 26. This shift register is implemented as a chain of additional accumulators, one in each processing element, which are also shown in FIG. 3. Loading and multiplication of a new pair of matrices by load ports 30 and 32 can then start immediately, concurrently with shifting the output data values out of array 26.

In the embodiment shown in FIG. 1, the shift register in processing elements 28 of each column of array 26 passes the output data values up the respective column. In each processing cycle, each processing element 28 passes its stored output data value to the next processing element up the column of the array and receives and stores a new output data value from the preceding processing element below it in the column. In each cycle, the processing elements in the top row of array 26 (PE 0,0; PE 0,1; . . . ; PE 0,W-1) shift out a row of data values of the output matrix to a RAM accumulator 36, which receives and stores the data values that are output from the array.

RAM accumulator 36 comprises an array of accumulator units 38, each comprising a matrix of memory cells and computational logic. These elements are described in greater detail hereinbelow with reference to FIG. 4. The memory cells typically comprise static RAM (SRAM), although other sorts of memory may alternatively be used. In the pictured embodiment, each column of array 26 feeds its output data values to a corresponding accumulator unit 38 of RAM accumulator 36. Depending on the computational task at hand, the computational logic is able to sum together the results of multiplication of multiple pairs of operand matrices and accumulate these sums in the RAM, using read-add-write operations. Additionally or alternatively, RAM accumulator 36 can receive an input matrix Cin from a memory 43 via a load port 42 and then sums the output data values from array 26 with Cin. Memory 43 may be a part of the system memory, for example, or a separate, dedicated memory.

RAM accumulator 36 outputs the data values that are stored in the RAM as a matrix Cout through a store port 40 to memory 43. Store port 40 and load port 42 typically carry out their functions in response to store and load descriptors, which indicate the source and destination base addresses and ranges of data to be written. A system controller 44, such as a suitable microprocessor, prepares and delivers the descriptors to store and load ports 40 and 42, as well as to load ports 30 and 32, typically under control of suitable software instructions.

RAM accumulator 36 outputs an accumulator release signal to synchronization logic 34 when it is ready to receive data from array 26. (This release may be delayed, for example, while awaiting completion of the input or output of data to the RAM accumulator via load port 42 or store port 40.) To avoid backpressure on processing elements 28, synchronization logic 34 will delay the release of the last vectors to multiply and the associated "rollup" indication until there is sufficient capacity available in RAM accumulator 36 to receive the new data values.

Figure 2A:
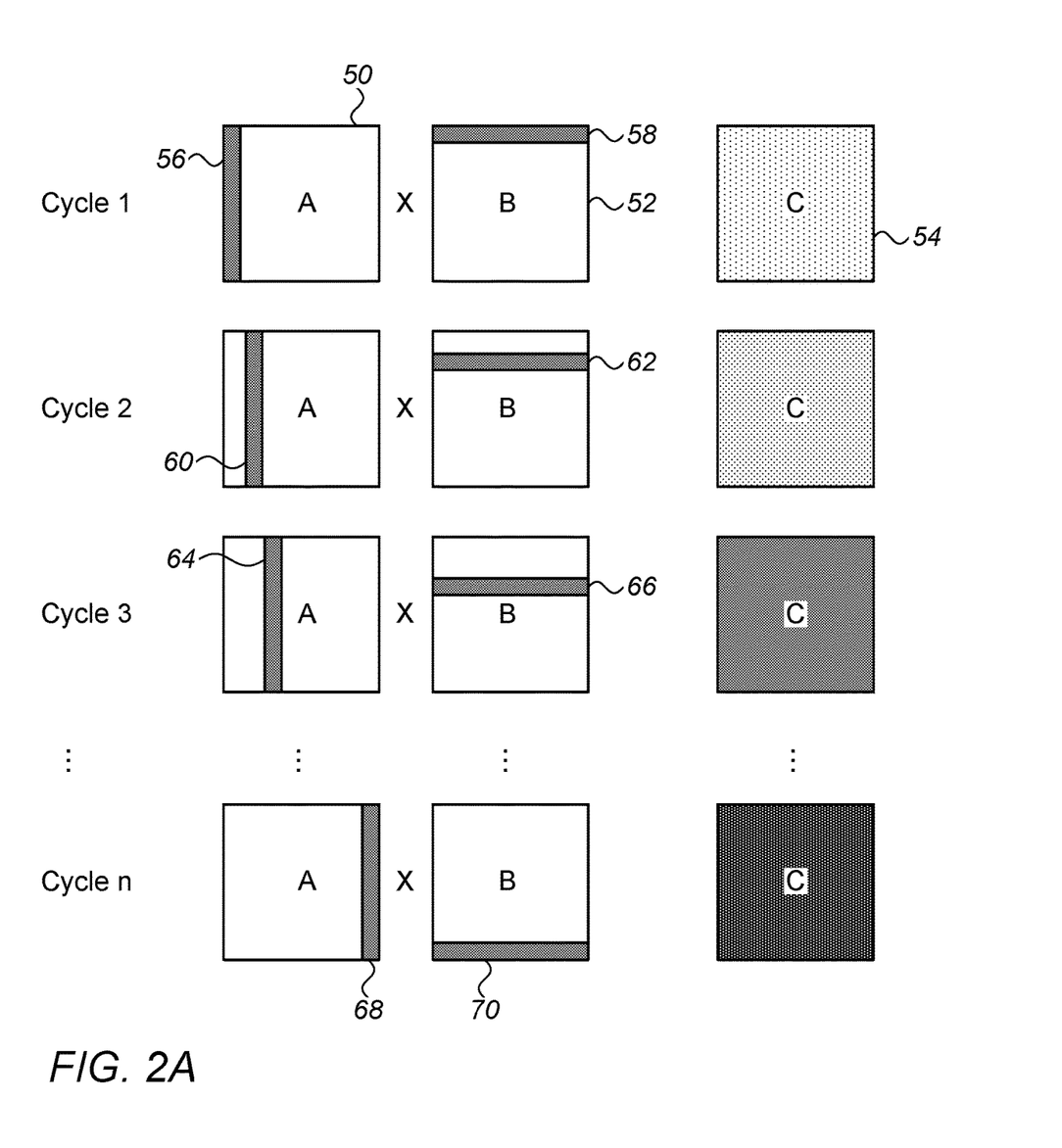
FIG. 2A is a block diagram that schematically illustrates a sequence of vector multiplications carried out in the course of computing an outer product of two matrices, in accordance with an embodiment of the invention.

FIG. 2A is a block diagram that schematically illustrates a sequence of vector multiplications carried out in the course of computing an outer product of two operand matrices 50 and 52 by accelerator 20, in accordance with an embodiment of the invention. The matrices are labeled A and B, in accordance with the notation of FIG. 1, and accelerator 20 computes their outer product as a matrix 54, labeled C. FIG. 2A is a conceptual illustration of the outer product computation in terms of the columns and rows of the operand vectors. In practice, as noted earlier, synchronization logic 34 applies different offsets to the matrix elements in different columns and rows in order to generate the vectors that are actually input to array 26. This synchronization functionality is described in detail hereinbelow with reference to FIG. 2B.

In cycle 1, vectors 56 and 58 are loaded from matrices 50 and 52, respectively, into accelerator 20. The accelerator computes and stores respective products of these operands in all of the elements of matrix 54. In cycle 2, the next pair of vectors 60 and 62 is loaded into accelerator 20, which computes and adds the products to the elements of matrix 54. These multiplication and addition steps are followed by a third pair of vectors 64 and 66 in the next cycle, up to a final pair of vectors 68 and 70 in the nth cycle.

Each pair of vectors is thus multiplied in array 26, and processing elements 28 accumulate the respective sums of products of their operands until all the columns and rows of matrices 50 and 52 have been processed. At this point, outer product matrix 54 is ready for readout to RAM accumulator 36.

Figure 2B:
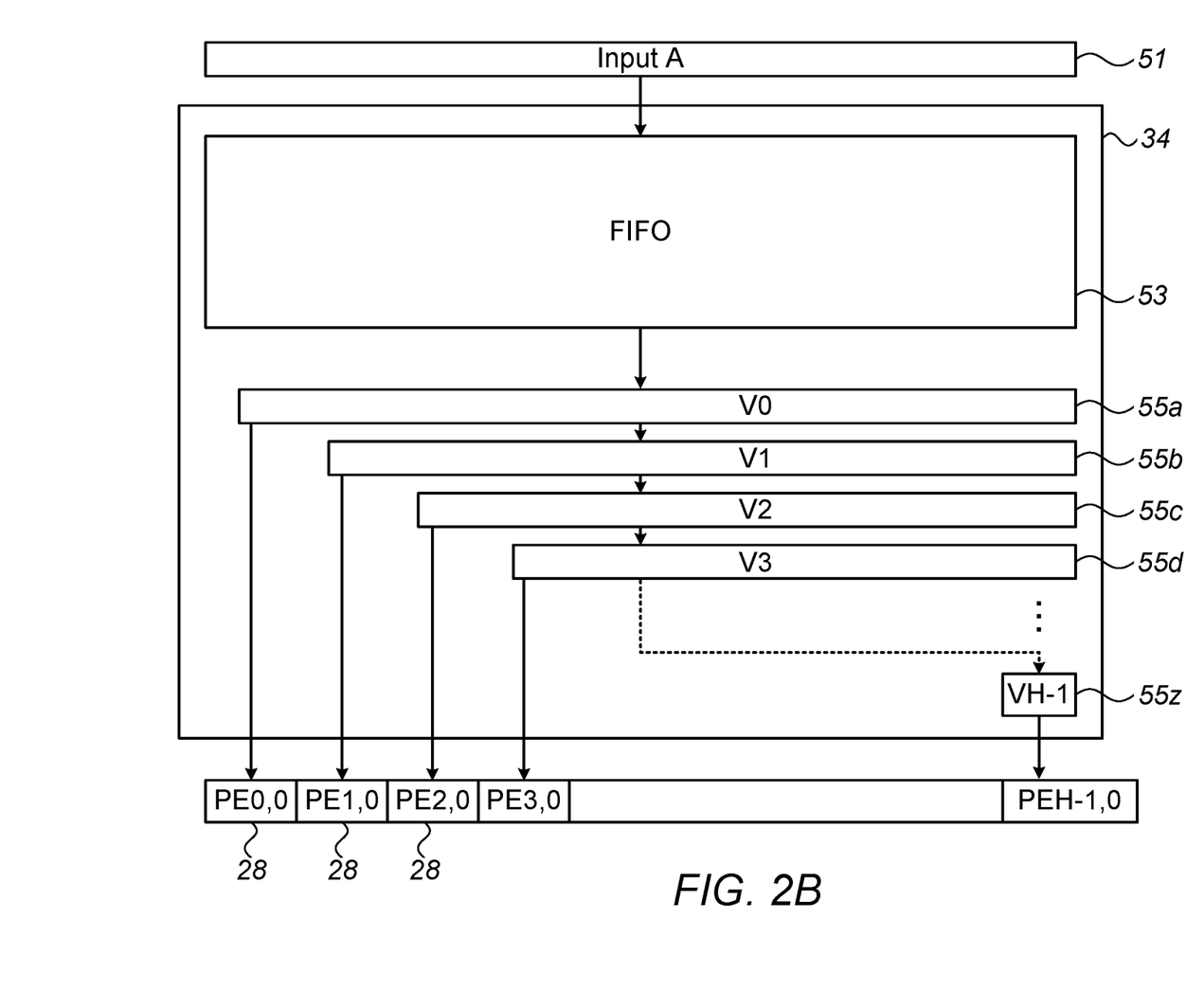
FIG. 2B is a block diagram that schematically shows details of synchronization logic, in accordance with an embodiment of the invention.

FIG. 2B is a block diagram that schematically shows details of synchronization logic 34, in accordance with an embodiment of the invention. For the sake of simplicity, FIG. 2B shows only the operation of the synchronization logic on the columns of matrix A, which are loaded via load port 30 and used to feed processing elements 28 in the first column of array 26. Synchronization logic operates on similar fashion on the rows of matrix B, which are loaded via load port 32 and used in feeding the first row of array 26.

Synchronization logic 34 receives successive columns of matrix A from memory 22 and applies different, respective offsets to the matrix elements in successive rows of the matrix in order to assemble the succession of column vectors that are input to the first column of array 26. In the pictured embodiment, synchronization logic 34 receives columns 51 in a first-in-first-out (FIFO) memory 53, which may be used to compensate for latencies in other branches of the data path in accelerator 20. Each column 51 is then passed through a sequence of delay registers 55a, 55b, 55c, . . . , 55z, of successively decreasing widths. The delay registers are labeled V0, V1, V2, V3, . . . , VH-1, and correspond to the H rows of array 26, as shown in FIG. 1. At each processing cycle, the value in the first cell in each delay register 55 is passed to the corresponding processing element 28 in the first column of array 26, while the remaining values are passed to the corresponding cells in the next delay register. In other words, the value in the first cell of V0 is passed to PE0,0; the value in the first cell of V1 is passed to PE1,0; and so forth up to the single cell in V H-1, which is passed to PE H-1, 0.

Thus, the column vector that is output by synchronization logic 34 in each processing cycle is actually made up elements taken from different columns of matrix A, due to the different delays offsets applied by the successive delay registers 55. These offsets ensure that the matrix elements will traverse array 26 in proper synchronization to compute the outer product that is shown in FIG. 2A. Because of the offsets, when a new matrix (or pair of operand matrices) is loaded into synchronization logic 34, initially not all of the elements in the corresponding vectors that are output from the synchronization logic to array 26 will be valid. (For example, in the first cycle, only the first element in each vector will be valid, followed by two elements in the next cycle, and so forth.) To deal with this situation, each vector element may include, along with the data, a "valid" flag, which synchronization logic 34 sets to mark the vector elements that are valid. Processing elements 28 check the valid flag in the vector elements that they receive and accordingly multiply and accumulate the data in the vector elements only when the flag is set.

FIG. 3 is a block diagram that schematically shows details of one of processing elements 28, in accordance with an embodiment of the invention. Processing element 28 comprises input terminals 72 and 74, which receive respective input operand values Bin and Ain from the adjacent processing elements in the preceding row and column of array 26, respectively. These same operand values are output via output terminals 84 and 86 to the input terminals of the adjacent processing elements in the next row and column of array 26, where they will serve as the operand values in the next processing cycle.

A multiplier 76 multiplies operands Ain and Bin together to generate a product, which is summed by an adder 78 and stored in a first accumulator 82. At the beginning of a cycle of multiplication of a new pair of input matrices (which can be triggered by a signal from synchronization logic 34), a multiplexer 80 inputs zero to adder 78, thereby initializing accumulator 82. In each cycle thereafter, the multiplexer inputs the current value in accumulator 82 to adder 78, to be summed with the product of multiplier 76.

Upon the last multiplication of a column of matrix A by a row of matrix B, synchronization logic 34 signals a multiplexer 88 to transfer the data values that are stored in accumulator 82 into a second accumulator 92. (The same synchronization signal can be applied to both of multiplexers 80 and 88.) In the next processing cycle, the output data value that is now stored in accumulator 92 will be passed via a store output terminal 94 to the next processing element 28 along the respective column of array 26. Accumulator 92 will then receive and store a new output data value, via a store input terminal 90, from the store output terminal of the preceding processing element 28 along the respective column.

Accumulator 92 thus serves as a stage in a shift register, through which all of the data values that were stored in accumulators 82 are now read out of array 26 to RAM accumulator 36. As noted earlier, this readout can be performed concurrently, i.e., in the same processing cycles, with the multiplication of the operands and accumulation of the data values in the product of the next pair of matrices.

Figure 4:
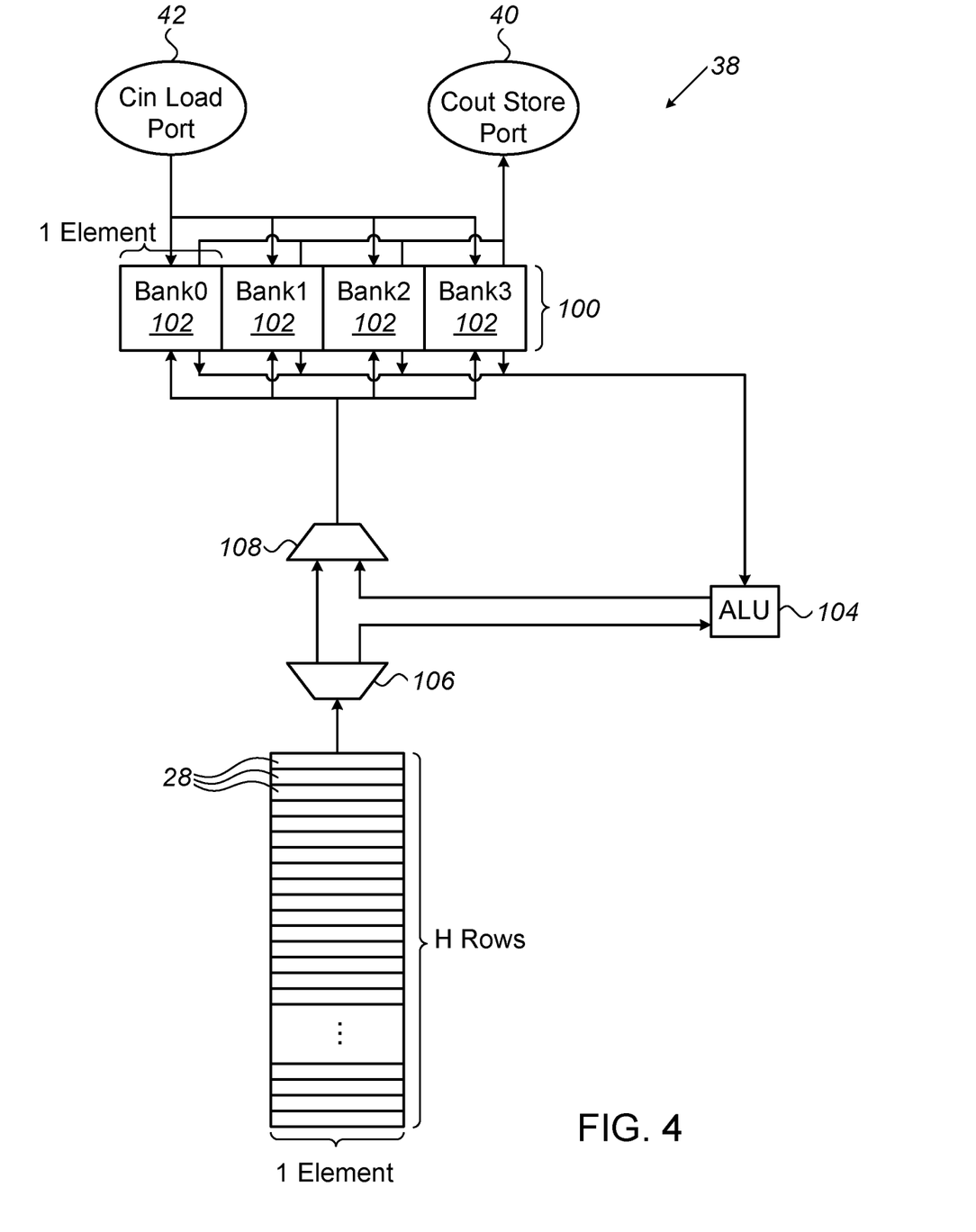
FIG. 4 is a block diagram that schematically shows details of a RAM-based accumulator unit, in accordance with an embodiment of the invention.

FIG. 4 is a block diagram that schematically shows details of one of accumulator units 38, in accordance with an embodiment of the invention, together with a corresponding column of processing elements 28 in array 26. Accumulator unit 38 comprises multiple banks 102 of cells of SRAM 100—four such banks in the present case—which are coupled to receive the data values that have been accumulated and output from the H processing elements 28 in the corresponding column. Accumulator unit 38 may associate each memory cell with a corresponding processing unit 28, so that each processing unit has a dedicated memory cell or group of memory cells in one or more of banks 102.

Division of the memory cells among multiple banks 102 is convenient in permitting concurrent access to several cells (four cells in the present example). Thus, for example, load and store ports 42 and 40 may load values into and read values from cells in one or two of the banks, while the other banks receive data values from array 26 or output data values to the computational logic of the accumulator unit. Receiving data values from array 26 is typically assigned higher priority than access by ports 42 and 40 in order to avoid stalling the readout of data values from the array.

The computational logic in each accumulator unit 38 comprises an arithmetic logic unit 104, which adds each of the data values that is output from array 26 to an accumulated data value that is stored in a corresponding memory cell in one of banks 102. The sum of the accumulated data value with the new output data value is then stored back in the corresponding memory cell, in a read-add-write operation. Multiplexers 106 and 108 control the data paths between array 26, memory banks 102 and ALU 104. This configuration of memory banks and computational logic enables accumulator unit 38 to read, sum and store the data values in the memory cells concurrently with the processing cycles of the array of processing elements, so that in each cycle, the data values that are output from the array are accumulated in the corresponding memory cells.

Although the figures and the above description present a particular implementation of the components of hardware accelerator 20, alternative implementations of the architectural principles of the systolic array and RAM-based accumulator that are described above will be apparent to those skilled in the art after reading the present patent application. Conversely, the specific logical implementations that are described above may alternatively be applied in other sorts of device architectures. All such alternative implementations and applications are considered to be within the scope of the present invention It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computational apparatus, comprising:
   a systolic array of processing elements arranged in a grid of rows and columns, each processing element comprising a multiplier and first and second accumulators and being configured such that in each of a sequence of processing cycles, the processing elements perform the following steps concurrently:

the processing elements in a first row of the array receive a first vector of first operands, while the processing elements in a first column of the array receive a second vector of second operands;

each processing element, except in the first row and first column, receives the first and second operands from adjacent processing elements in a preceding row and column of the array, respectively, multiplies the first and second operands together to generate a product, and accumulates the product in the first accumulator; and each processing element passes a stored output data value from the second accumulator to a succeeding processing element along a respective column of the array, receives a new output data value from a preceding processing element along the respective column, and stores the new output data value in the second accumulator; and synchronization logic, which is coupled to load a succession of the first and second vectors into the first row and first column of the array, and upon completion of processing of the succession by the array, to trigger the processing elements to transfer respective data values from the first accumulator to the second accumulator for output from the array.

2. The apparatus according to claim 1, wherein the processing elements are configured to pass the stored output data values that were computed over a first succession of the first and second vectors through the second accumulators along the columns of the array concurrently with processing the operands in a second succession of the first and second vectors and accumulating products of the operands in the first accumulators.

3. The apparatus according to claim 2, wherein each of the first and second successions of the first and second vectors comprises a respective pair of matrices to be multiplied together.

4. The apparatus according to claim 3, wherein the synchronization logic is coupled to receive successive rows and columns of the matrices from a memory and to apply different, respective offsets to successive matrix elements in the received columns and rows of the matrices in order to assemble the succession of the first and second vectors for input to the array.

5. The apparatus according to claim 3, wherein the processing elements are arranged to compute and output an outer product of each pair of the matrices.

6. The apparatus according to claim 1, and comprising a random-access memory (RAM), which is coupled to receive and store the data values that are output successively from the second accumulators in an output row of the array over the sequence of processing cycles.

7. The apparatus according to claim 6, wherein the RAM comprises a matrix of memory cells and is configured to accumulate the data values that are computed by the processing elements and output from the array in memory cells that correspond respectively to the processing elements that computed the data values.

8. The apparatus according to claim 7, and comprising computational logic, which is coupled to add each of the data values that is output from the array to an accumulated data value that is stored in a corresponding memory cell so as to generate a sum, and to store the sum in the corresponding memory cell.

9. The apparatus according to claim 8, wherein the computational logic is configured read, sum and store the data values in the memory cells concurrently with the processing cycles of the array of processing elements, so that in each cycle, the data values that are output from the array are accumulated in the corresponding memory cells.

10. The apparatus according to claim 8, wherein the RAM comprises a first plurality of banks of the memory cells, which are coupled to respective columns of the array, and wherein the computational logic comprises a second plurality of arithmetic logic units, each coupled to read and sum the data values that are output from a respective column of the array.

11. The apparatus according to claim 6, wherein the RAM comprises load and store ports, which are coupled to transfer data into and out of the RAM, wherein the synchronization logic is configured to delay transferring the output data values from the array to the RAM until the data currently stored in the RAM has been transferred out through the store port.

12. A method for computation, comprising:
providing a systolic array of processing elements arranged in a grid of rows and columns, each processing element comprising a multiplier and first and second accumulators;
in each of a sequence of processing cycles, performing the following steps concurrently:
receiving a first vector of first operands in the processing elements in a first row of the array, and receiving a second vector of second operand the processing elements in a first column of the array;
receiving in each processing element, except in the first row and first column, the first and second operands from adjacent processing elements in a preceding row and column of the array, respectively;
multiplying the first and second operands together in each processing element to generate a product, and accumulates the product in the first accumulator;
passing a stored output data value from the second accumulator in each processing element to a succeeding processing element along a respective column of the array; and
receiving in each processing element a new output data value from a preceding processing element along the respective column, and storing the new output data value in the second accumulator;
loading a succession of the first and second vectors into the first row and column of the array; and
upon completion of processing of the succession by the array, triggering the processing elements to transfer respective data values from the first accumulator to the second accumulator for output from the array.

13. The method according to claim 12, wherein passing the stored output data value comprises passing the output data values that were computed over a first succession of the first and second vectors through the second accumulators along the columns of the array concurrently with processing the operands in a second succession of the first and second vectors and accumulating products of the operands in the first accumulators.

14. The method according to claim 13, wherein each of the first and second successions of the first and second vectors comprises a respective pair of matrices to be multiplied together.

15. The method according to claim 14, wherein loading the succession of the first and second vectors comprises receiving successive rows and columns of the matrices from a memory and applying different, respective offsets to successive matrix elements in the received columns and rows of the matrices in order to assemble the succession of the first and second vectors for input to the array.

16. The method according to claim 14, wherein processing the succession of the first and second vectors comprises computing and outputting an outer product of each pair of the matrices.

17. The method according to claim 13, and comprising outputting the data values successively from the second accumulators in an output row of the array over the sequence of processing cycles to a random-access memory (RAM), and storing the data values in the RAM.

18. The method according to claim 17, wherein storing the data values comprises accumulating the data values that are computed by the processing elements and output from the array in memory cells of the RAM that correspond respectively to the processing elements that computed the data values.

19. The method according to claim 18, wherein accumulating the data values comprises adding each of the data values that is output from the array to an accumulated data value that is stored in a corresponding memory cell so as to generate a sum, and to storing the sum in the corresponding memory cell.

20. The method according to claim 19, wherein adding each of the data values comprises reading, summing and storing the data values in the memory cells concurrently with the processing cycles of the array of processing elements, so that in each cycle, the data values that are output from the array are accumulated in the corresponding memory cells.

21. The method according to claim 19, wherein the RAM comprises a first plurality of banks of the memory cells, which are coupled to respective columns of the array, and the method comprises coupling a second plurality of arithmetic logic units to the RAM so that each of the arithmetic logic units reads and sums the data values that are output from a respective column of the array.

22. The method according to claim 17, wherein the RAM comprises load and store ports, which are coupled to transfer data into and out of the RAM, wherein outputting the data values comprises delaying transferring the output data values from the array to the RAM until the data currently stored in the RAM has been transferred out through the store port.

\* \* \* \* \*